United States Patent
Leclair et al.

(10) Patent No.: US 8,190,030 B2
(45) Date of Patent: May 29, 2012

(54) SINGLE APERTURE MULTIPLE OPTICAL WAVEGUIDE TRANSCEIVER

(75) Inventors: Lance Richard Leclair, Manassas, VA (US); Priyavadan Mamidipudi, Bristow, VA (US)

(73) Assignee: Optical Air Data Systems, LLC, Manassas, VA (US)

( * ) Notice: Subject to any disclaimer, the term of this patent is extended or adjusted under 35 U.S.C. 154(b) by 797 days.

(21) Appl. No.: 12/084,849

(22) PCT Filed: Nov. 13, 2006

(86) PCT No.: PCT/US2006/043928
§ 371 (c)(1), (2), (4) Date: Jan. 5, 2009

(87) PCT Pub. No.: WO2007/084209
PCT Pub. Date: Jul. 26, 2007

(65) Prior Publication Data
US 2009/0142066 A1    Jun. 4, 2009

Related U.S. Application Data (60) Provisional application No. 60/735,164, filed on Nov. 10, 2005.

(51) Int. Cl.
*H04B 10/00* (2006.01)

(52) U.S. Cl. ........ 398/139; 398/135; 398/140; 398/142; 398/156

(58) Field of Classification Search .......... 398/135, 398/139, 140, 142
See application file for complete search history.

(56) References Cited

U.S. PATENT DOCUMENTS

| | | | |
|---|---|---|---|
| 5,042,898 A | 8/1991 | Morey et al. | |
| 5,272,513 A | 12/1993 | Vahala et al. | |
| 5,864,644 A | 1/1999 | DiGiovanni et al. | |
| 6,310,704 B1 | 10/2001 | Dogan et al. | |
| 6,317,554 B1 | 11/2001 | Kosaka et al. | |
| 6,498,647 B1 | 12/2002 | Kuehnle | |
| 6,628,876 B1 | 9/2003 | Shmulovich | |
| 6,757,467 B1 | 6/2004 | Rogers | |
| 6,904,199 B2 | 6/2005 | Zuluaga | |

(Continued)

FOREIGN PATENT DOCUMENTS

EP    0 583 075 A1    2/1994

(Continued)

OTHER PUBLICATIONS

English Abstract for Japanese Patent Pub. No. JP 1-287505 A, published Nov. 20, 1989, 1 page, provided by http://worldwide.espacenet.com.

(Continued)

*Primary Examiner* — Dung Nguyen
(74) *Attorney, Agent, or Firm* — Sterne, Kessler, Goldstein & Fox P.L.L.C.

(57) ABSTRACT

A single-aperture, multi-axial transceiver is provided that is particularly useful in a LIDAR system for detecting low velocities at increased ranges. The system is particularly useful in systems that are required to measure very low velocities and very short distances as well as to provide an operating range of hundreds of meters. The transceiver uses closely spaced waveguides placed near the focal point of a single objective 8 to form input and detector apertures. Preferably the input and detector apertures are spaced from each other by less than about 80 µm. In an embodiment using light with a wavelength of 1550 nm, the spacing is preferably about 30 µm.

8 Claims, 5 Drawing Sheets

U.S. PATENT DOCUMENTS

| | | | |
|---|---|---|---|
| 7,742,669 B2* | 6/2010 | Dong et al. | 385/115 |
| 2001/0046352 A1 | 11/2001 | Ohta et al. | |
| 2003/0053222 A1* | 3/2003 | Togami et al. | 359/726 |
| 2003/0174329 A1 | 9/2003 | Kuper et al. | |
| 2005/0031350 A1 | 2/2005 | Haber | |
| 2005/0123241 A1* | 6/2005 | Margalit et al. | 385/39 |

FOREIGN PATENT DOCUMENTS

| | | |
|---|---|---|
| JP | 1-287505 A | 11/1989 |
| JP | 6-167447 A | 6/1994 |
| JP | 2003-504625 A | 2/2003 |

OTHER PUBLICATIONS

English Abstract for Japanese Patent Pub. No. JP 6-167447 A, published Jun. 14, 1994, 1 page, provided by http://worldwide.espacenet.com.

Brief English Translation of Japanese Office Action, mailed Jun. 14, 2011, in Japanese Patent Appl. No. 2008-540239, 2 pages.

Allen, C.T. and Chong, S.K., *Development of a 1319-nm Laser Radar Using Fiber Optics and RF Pulse Compression*, University of Kansas Technical Report ITTC-RSL-FY2002-TR-18680-01, entire report (May 2002).

Jelalian, A.V., *Laser Radar Systems*, Artech House, ISBN: 0-89006-554-3, entire book (1991).

Mamidipudi, P., *Enhanced Detection Using Coherent Summation of Multiple Detector Heterodyne 1.55 Micron Lidar Signals Degraded by Atmospheric Turbulance and Target Speckle*, Ph.D. Thesis, University of South Florida, entire thesis (2002).

Measures, R.M., *Laser Remote Sensing Fundamental and Applications*, Krieger Publishing Company, ISBN: 0-89464-619-2, entire book (1984).

International Search Report, dated Oct. 5, 2007, from PCT Appl. No. PCT/US06/43928, 1 page.

International Preliminary Report on Patentability, dated May 14, 2008, from PCT Appl. No. PCT/US06/43928, 4 pages.

Office Action, dated Aug. 31, 2009, for Australian Patent Appl. No. 2006336215, 2 pages.

Notice of Acceptance, dated Nov. 2, 2010, for Australian Patent Appl. No. 2006336215, 1 page.

Office Action, dated Feb. 25, 2010, for Canadian Patent Appl. No. 2,629,319, 3 pages.

Office Action, dated Sep. 21, 2010, for Canadian Patent Appl. No. 2,629,319, 4 pages.

Notice of Allowance, dated Apr. 7, 2011, for Canadian Patent Appl. No. 2,629,319, 3 pages.

* cited by examiner

SINGLE APERTURE MULTIPLE OPTICAL WAVEGUIDE TRANSCEIVER

This application is the national stage of International Application Number PCT/US2006/043928, filed Nov. 13, 2006, which was published in English, and claims priority of U.S. Provisional Application No. 60/735,164, filed Nov. 10, 2005.

TECHNICAL FIELD

This invention relates to the art of optical transceivers. The invention finds particular applicability in single aperture LIDAR and velocity measurement systems using fiber optic elements.

BACKGROUND ART

This invention relates generally to optics, optical waveguides, and optical systems and devices. It is especially relevant to LIDAR (Light Detection And Ranging) and optical communication systems where optimal performance at a short range is desired. In its simplest form, a LIDAR system has an optical transmitter (typically a laser) and an optical receiver placed side-by-side, pointed in the same direction. Collectively these are known as a transceiver. The transmitter provides a short-pulsed beam of light that is directed at a target. Direct detection of the intensity of light returned from the target can be used to determine the range to the target. Coherent detection of the light returned from a moving target enables its Doppler frequency to be measured, and thus its velocity. Velocity determination can also be done with a continuous wave (CW) laser.

Figure 1:
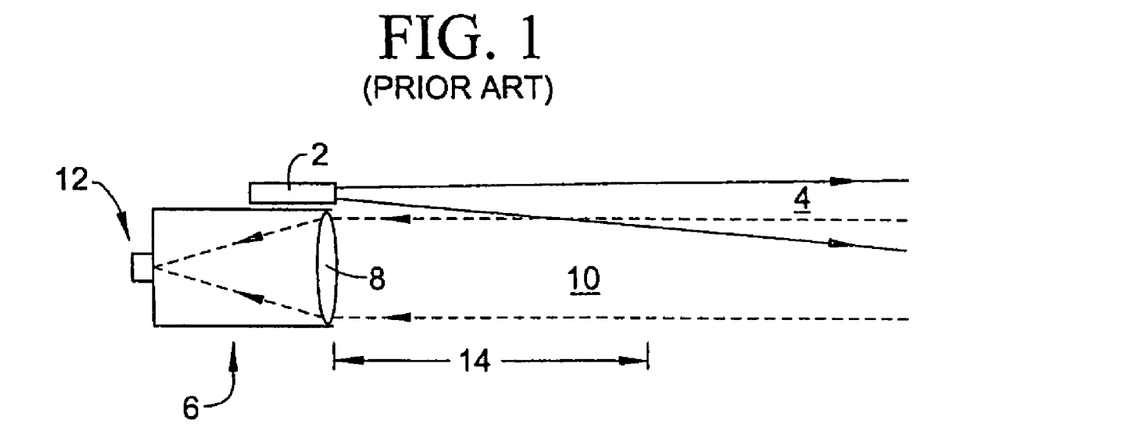
FIG. 1 illustrates a prior art biaxial, dual-aperture arrangement.

There are several common transceiver designs, and one of the simplest is depicted in FIG. 1. In this configuration a laser 2 transmits a beam of illumination 4 toward a distant target (not illustrated). A receiver telescope 6 includes an objective 8 that focuses light in its field of view (FOV) 10 returned from the target, as by reflection or backscattering, onto a detector 12. This configuration is often referred to as a bi-axial, dual-aperture transceiver because the optical axis of the beam 4 from the laser 2 and the axis of the FOV of the receiver telescope 6 are independent, and because the laser beam and detector do not share the same aperture. This geometry is problematic because it creates a 'blind spot' 14 in front of the receiver in the region where the transmitter beam and receiver FOV do not overlap. The length of the blind spot represents the minimum range of operation, and it will be appreciated that if the axes of the illumination beam 4 and the FOV of the telescope 6 are inclined toward each other to reduce the minimum range by shortening the blind spot 14, a new blind spot (not illustrated) will then be created beginning at the distant point where the laser beam and the FOV no longer overlap because of their divergence.

Figure 2:
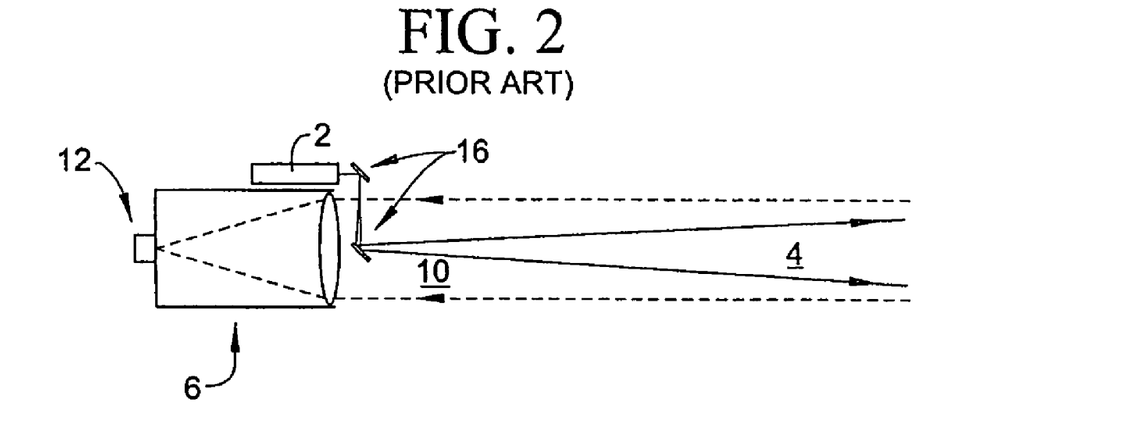
FIG. 2 illustrates a prior art coaxial, dual-aperture arrangement.

FIG. 2 illustrates an improvement on the design of FIG. 1. This is commonly referred to as a co-axial, dual-aperture design. In this configuration, the illuminating beam from the laser 2 is directed by mirrors 16 to be co-axial with the FOV or the returned light 10. This configuration still has a blind spot because the central mirror obscures a portion of the telescope FOV, but it is much smaller than the blind spot of the bi-axial, dual-aperture transceiver illustrated in FIG. 1. Moreover, the laser beam 4 and receiver FOV 10 can be made to overlap all the way out to infinity, such that there is no distant blind spot.

In some applications, however, it is highly desirable to have no blind spots. This can only be accomplished by combining the laser beam into the FOV of the receiver to completely overlap the two fields at any range. This requires a coaxial, single-aperture transceiver design.

Figure 3:
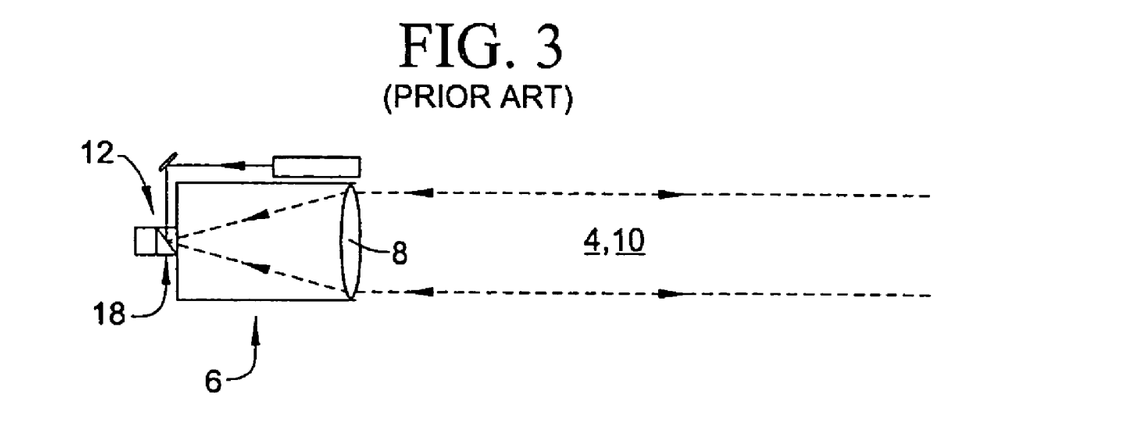
FIG. 3 illustrates a prior art coaxial, single aperture arrangement

The configuration illustrated in FIG. 3 uses the properties of highly polarized light from the laser 2 to fold it into the FOV of the telescope by using a polarizing beam splitter (PBS) 18 in front of the detector. There is a penalty for the arrangement of FIG. 3, however, because, in general, light from non-metallic targets is randomly polarized, so only 50% of the return signal passes through the PBS 18 on its way to the detector. This is worse when the LIDAR is used on partially polarizing targets or even more so in the case of purely specular targets. In the latter case, all of the return signal would be directed back to the laser unless one uses the usual trick of placing a quarter-wave plate between the PBS 18 and the entrance to the telescope with its fast axis at 45°.

There are ways to get around the return power loss penalty of FIG. 3, most of them involving combinations of PBS's in other forms, Faraday effect materials, and so called 'walk-off' crystals made from birefringent materials. One commercially available device that could be used is called an optical circulator, which is a compact, three-port device that allows light to travel from ports 1 to 2, but light traveling in the reverse direction, from port 2 to 1 is redirected to port 3.

Figure 4:
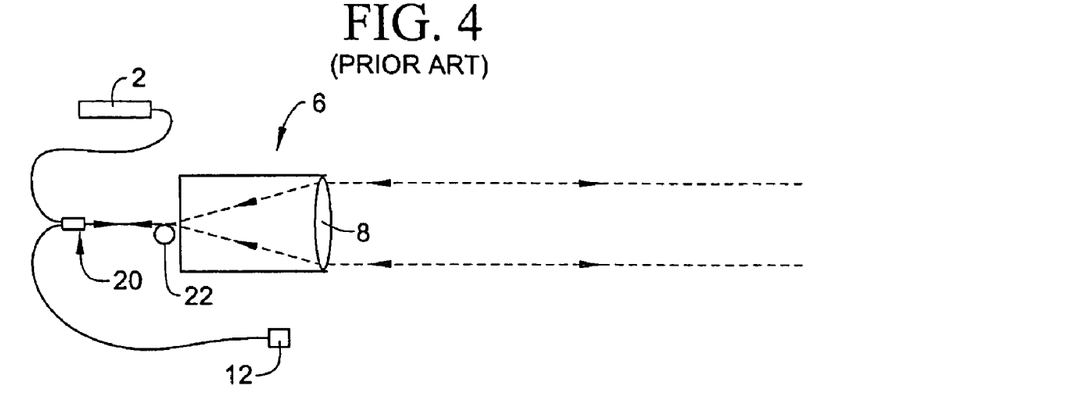
FIG. 4 illustrates a second prior art coaxial, single aperture arrangement.

FIG. 4 illustrates a coaxial, single-aperture LIDAR transceiver with a fiber optic circulator 20. The circulator directs light from the laser 2 to an optical fiber 22 having its exit end positioned at the focal point of the objective 8. Light returning from the target is focused onto the end of the fiber 22, and the circulator directs this returning light to an output fiber connected to detector 12. This system offers the advantage that the transceiver can be located remotely from the laser 2 and detector 12, which is useful in those situations where space is at a premium (e.g., an aircraft). Moreover, there is only one bulk optic element (the objective lens in this case), which provides advantages in both size and weight over two-aperture transceivers.

There is a subtle problem with the transceivers illustrated in FIGS. 3 and 4. The main characteristic of these transceivers is that light from the transmitter shares optical elements with the receiver. Unfortunately, real-world optical elements do not behave ideally, and some of the illuminating light from the laser 2 necessarily makes its way to the receiver.

Figure 5:
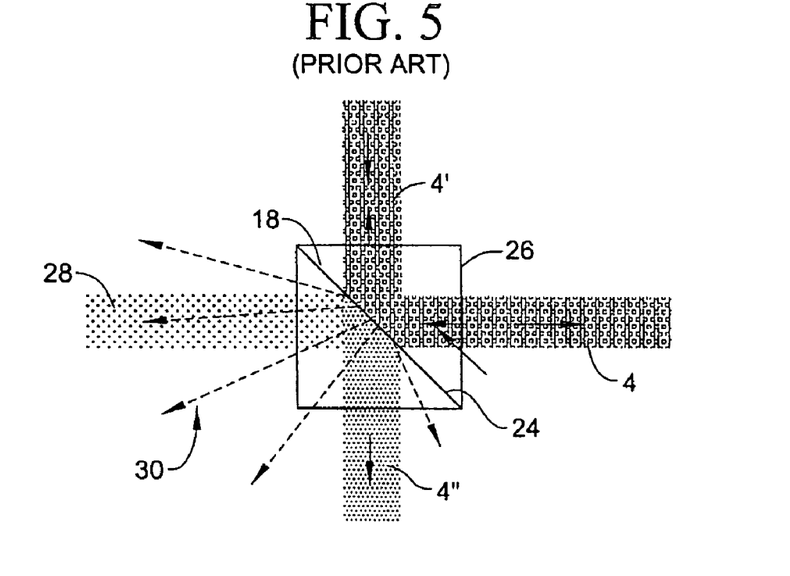
FIG. 5 illustrates a prior art polarizing beam splitter.

As an example, a polarizing beam splitter (PBS) generally leaks at least some of the polarized light arising from reflections at the interfaces. Additionally, imperfections on the reflecting surfaces scatter the impinging light in all directions. With reference to FIG. 5, a polarizig beam splitter 18 is shown with illuminating beam 4' incident thereon. A polarizing reflecting surface 24 reflects most of the light 4' to form the outgoing beam 4, but some of the beam 4 is reflected at planar surface 26 of the prism forming the polarizing beam splitter. Light reflected from surface 26 can pass back through the polarizing reflecting surface to as beam, which will be incident on the detector. Also, some of the light 4' will be transmitted by the surface 24 as shown at 4", and that light will be scattered by imperfections in the reflecting surface to form scattered light 30.

Consider first the problem of leakage. Some of the incoming light will be partially transmitted through the reflecting surface 24 of the PBS (typically 0.01 to 0.1%) to form beam 4". The 'leaked' light from the transmitter direction does not pose a problem as long as adequate steps are taken to shield the detector from it, but this can be difficult at high pulse powers. Next, the back-reflection 28 from the output surface 26 can be made quite low with the appropriate anti-reflection (AR) coating (say 0.1%) and since the back reflected light has the same polarization as the incident light, most of it will be directed back towards the transmitter. But enough of it will reach the detector with an intensity that is comparable to or greater than that of the return signal from the target.

Another imperfection is scattering. PBS's are made from two right prisms that have their hypotenuses coated with a special dielectric layer and then bonded together. There will be some scatter from this interface (24 in FIG. 5) due to microscopic polishing and coating imperfections. Although the intensity of the scattered light 30 can be made extremely low by careful manufacturing (usually at significantly increased cost), the amount of scattered light that reaches the detector from the diagonal surface can be comparable to the signal returned from the target. In general, all interfaces generate some degree of scattering, but the diagonal surface is in the FOV of the detector, so it contributes the most.

There are other sources of scattering that arise from the bulk properties of the optic elements themselves (e.g., Rayleigh and Brillouin scattering). The contributions from these sources are extremely small compared to 'interface' sources, but they are fundamental properties of bulk matter. These bulk properties impose ultimate limits on the weakest signal that can be detected when the transmitter and receiver share the same optical elements.

Since fiber optic components like circulators are composed of many small optical elements similar to PBS's they suffer from the same problems. In fact the best commercially available circulators presently have an isolation between the transmitter port and the receiver port of about 60 dB. While this may be acceptable for telecommunication systems, it presents a problem in LIDAR systems, as return beams are usually reduced by more than 60 dB relative to the transmitter.

Thus, scattering, back-reflection, and light leakage from the optical elements shared by both the laser and detector in a coaxial, single-aperture transceiver generate light at the detector that is usually comparable to that of the weak signal returned from the target. Special care and attention must be paid to the design and construction of these transceivers in order to isolate the high-power, out-going laser beam from the return signal.

In range finding applications, the isolation may be so inadequate and the pulse peak power so high that the light from the transceiver alone temporarily blinds sensitive detectors. In this situation one can temporarily power off the receiver (gating), but this creates a blind spot at close range due to the switching times involved (or detector recovery time if it is not switched off). The inability of a LIDAR system to determine distance at close range because of isolation is sometime refered to as the "t=0 problem".

For Doppler CW LIDAR systems, insufficient isolation causes a permanent Doppler signal at zero velocity (also called the "v=0 problem"). This signal will generally have a linewidth equal to that of the transmitter laser, and thus limit the minimum speed that can be detected. Pulsing is required to eliminate the zero-velocity Doppler signal to allow measurement of very low speeds, but this is ineffective if one desires to do velocity sensing and very close ranges.

One approach to get around the inadequate isolation offered by the circulator method has been described in U.S. Pat. No. 6,757,467 (Rogers). In this approach, a double clad fiber having a single mode core has its tip placed at the focal point of a lens so that transmitter light leaving the single mode core is substantially collimated by the lens. Return light from a hard target is then collected by the lens and focused back on the single mode core. The image of this returned light is substantially larger than the single mode core, so most of the return light is collected by the inner cladding of the fiber, extracted, and then transferred to a detector to make a useful LIDAR transceiver.

However this approach also suffers from an isolation comparable to the circulator approach. This is because light propagating in the single mode core actually extends beyond the core (so-called evanescent wave). When this light reaches the tip of the fiber, some of the evanescent wave is reflected back into the inner cladding. The intensity of this back-reflection is usually stronger than the return. Another drawback to this method is that light in the inner cladding is multimode, making coherent detection for velocity sensing poor so the approach described by U.S. Pat. No. 6,757,467 is mostly relegated to range finding.

Another approach that circumvents the use of cirulators involves placing fiber optic wave guides side-by-side as close as possible. One fiber is the transmitter while the other fiber is the receiver. The transmitter tip is place at the focal point of an objective lens to create a substantially collimated beam. The transmitter beam creates a bright spot on the target, and the objective lens then creates an image of this spot centered on the transmitter fiber. By placing the receiver fiber within this image, a small amount of signal can be extracted for range finding and velocity sensing purposes.

Upon analysis it is clear that this approach has great merit because it is capable of a high degree of isolation. However it is also clear that the maximum sensing range of this approach is limited by the space between the receiver and transmitter fibers. Those previous groups used commercially available telecom fiber (125 μm in diameter) placed in V-grooves and did not appear to make an effort to bring the waveguides closer together to improve the range of their transceivers.

The aim of the invention described herein improves upon the last approach by using several different methods to take commercially available optical fiber and bring them closer together to extend the range of this type of optical transceiver, while preserving the excellent isolation offered by the design, It finds it usefulness in LIDAR systems that are required to sense range and velocity (among other possibilities) from a range of zero to several hundred meters. One such use for such a LIDAR system is to assist in the landing of manned and unmanned aircraft, or for collision avoidance in autonomous vehicles.

SUMMARY OF THE INVENTION

In accordance with the invention a laser ranging and velocity measuring system is provided that address the above concerns in the prior art. In a preferred embodiment of the invention a single aperture LIDAR transceiver provides closely spaced illumination source and detector apertures with markedly reduced leakage between the two and increased range. These improvements are obtained by placing one or more illuminating and detecting apertures very close to each other near the focal plane of a telescope objective. Preferably, the apertures are formed by respective ends of two or more optical fibers or, alternatively, optical waveguides.

Figure 6:
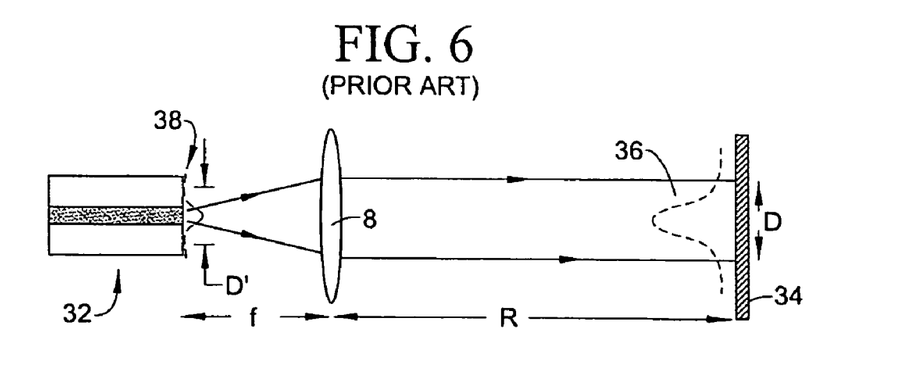
FIG. 6 illustrates a prior art single waveguide transceiver.

To determine a desired distance between the input and output apertures, consider a single mode optical waveguide 32 with its output tip placed at the focal point of an objective 8, as illustrated in FIG. 6. Light projected from the end of the waveguide is collimated by objective 8, and the collimated beam impinges on a target 34 at a distance R from the objective 8. Multimode optical waveguides may also be used.

In this embodiment the optical waveguide has a circular cross section, so it provides a spot 36, which is a cylindrically symmetric Gaussian intensity distribution of light on the target. The diameter D of the light spot 36 on the target 34 is usually defined for a Gaussian distribution as the distance between points at which the intensity falls off to $1/e^2$ of the maximum. Spot 36 now forms the 'object' of the objective 8, and the 'image' is formed by the objective 8 as spot 38 on the end of the fiber. We can use the simple lens equation to calculate the location and size of the spot 38 to a good approximation.

The simple lens equation is $$1/u + 1/v = 1/f \qquad (1)$$

where u is the distance from the lens to the 'object' (R in our case), v is the distance from the image to the lens and is the focal length of the lens. The magnification of a simple lens is M=−v/u (where the minus simply means the image is inverted). Thus the image of the spot will have a diameter $$D' = \frac{-Df}{R-f} \qquad (2)$$

at a distance v from the lens (FIG. 6). If a second optical waveguide is placed within this diameter it will receive some portion of the return signal. An important part of the invention is to take advantage of the size of the image produced by the objective 8, i.e., the spot 38 made by the objective 8 from the spot 36 on the target 34, and place one or more detector apertures, or receiver optical wave-guides, in the spot 38. In practice, this requires the detector aperture to be very close to the output end of the transmitter waveguide 32.

For example in the case of a lens 8 with a focal length of 150 mm, a desired range R of 30 m, and a collimated beam diameter of 50 mm, the size of the image 38 will be D'=0.250 mm (radius=0.125 mm). This is a small spot, but optical waveguides are smaller, approximately 0.01 mm in diameter for single mode, so one can place a second waveguide (or even more) within the radius of the image.

Note that in this example, the image will appear at a distance v=150.8 mm from the lens, or about 0.8 mm from the tip of the transmitter waveguide, away from the lens. The tip of the receiver optical waveguide could be recessed slightly the tip of the transmitter, but if the focal length of the lens is long compared to this offset (as it is in our example) the tip of the receiver optical waveguide could be placed in the same plane as the tip of the transmitter fiber without significant coupling loss because the image will only be slightly larger (defocused).

One can see from equation (2) that as the target recedes from the transceiver, the image size diminishes (as R goes to infinity, D' goes to zero). Thus, for a given distance between the receiver and transmitter waveguides, there is a limit to the range at which this transceiver works. This range limit depends on the size of the waveguides as well. For example, larger waveguides produce beams with larger divergence. It is also possible to increase the range by offsetting, or staggering, the output of one waveguide towards the lens with respect to the other but this requires careful design so that one waveguide will not clip the beam of the other.

It is not possible to place the waveguides side-by side with zero spacing because the evanescent field from the core of the transmitter fiber will couple to the core of the receiver fiber or waveguide. As a rule-of-thumb for step-index optical waveguides, the fibers should be separated by at least ten wavelengths of the light propagating in the guides to prevent evanescent coupling. Moreover, if multiple receiver waveguides are used for coherent summation each waveguide must be separated far enough from any other to observe a spatially independent speckle cell.

For a more exact analysis to determine the minimum waveguide separation for a single mode waveguide transceiver, one can calculate the coupling between two closely space optical waveguides. Coupled-mode theory provides an approximation that works well as long as the overlap of the fundamental modes is less than 5%. The central result of coupled-mode theory for two identical waveguides is $$P_T = (x=0)\cos^2[\kappa\chi] \qquad (3)$$

$$P_R = P(x=0)\sin^2[\kappa\chi] \qquad (4)$$

where $P_T$ is the power in the transmitter waveguide, and $P_R$ is the power in the receiver waveguide and κ is the coupling coefficient given by $$\kappa = 0.5(n_c^2 - n_o^2)\frac{k_0^2}{\beta}\frac{\left|\int\int E_T^*(x,y)E_R(x,y)dxdy\right|^2}{\int\int |E_T(x,y)|^2 dxdy} \qquad (5)$$

where $n_c$ and $n_o$ are the index of refraction for the core and cladding respectively, $k_o=2\pi/\lambda$ where λ is the vacuum wavelength and β is the propagation constant, which, for the fundamental mode depends on the V number of the fiber. For V=0, $\beta=n_0 k_0$ but as V gets large (>>1) β is approximately equal to $n_o k_0$. $E_T$ and $E_R$ are the electric fields of single modes the transmitter and receiver waveguides respectively. The fundamental mode for cylindrically symmetric waveguides can be approximated by the Gaussian functions:

$$E_T = \sqrt{\frac{2}{\pi\omega_0^2}} \exp[-2(x^2+y^2)/\omega_0^2] \qquad (6)$$

$$E_R = \sqrt{\frac{2}{\pi\omega_0^2}} \exp[-2((x-d)^2+y^2)/\omega_0^2] \qquad (7)$$

where $\omega_o$ is the mode field diameter and d is the separation of the waveguides. According to (3) and (4) the transfer of power from the waveguide to the receiver waveguide is periodic, with a period given by π/κ. At π/2κ all of the transmitter power is coupled into the receiver fiber.

For a transceiver requiring high isolation, the input and detector waveguides may be very close to each other (geometrically achieving a very long range) if the interaction length waveguides are trimmed to provide an integral multiple of π/κ to reduce the coupling. In practice this is very difficult to do because of the tolerances required, and it is compounded for multiple waveguides. Moreover those periodic points at which the power does couple into the receiver fiber can be strong enough to create significant backscattered light (e.g., Rayleigh scattering) that will find its way back into the receiver.

Preferably the waveguides are spaced sufficiently far apart to make the coupling period much larger than the length over which the two waveguides interact For example, in one embodiment, a biaxial transceiver operates at λ=1550 nm with cylindrical waveguides having a numerical aperture of 0.14 and a core diameter of 8.2 μm (e.g., telecom fiber Corning SMF-28), and the wave guides are separated by 30 μm. The value of the overlap integral in equation (5) is approximately $2\times10^{-7}$, which is much less than 5%. The value for κ is $5\times10^{-3}$ m$^{-1}$, making the period about 594 meters.

If the interaction length is 10 mm, then the amount of power coupled into the receiver waveguide is about −85 dB below the power in the transmitter waveguide. This power will continue in the forward direction but about 4% of it will reflect from of tip of the receiver waveguide back to the receiver, bringing the total isolation from the transmitter to the receiver down to about −99 dB. The actual value is about −96 because the back-reflection from the transmitter waveguide also couples into the receiver waveguide. The amount of back reflected light that re-couples into the other waveguide is negligible for our purposes.

Figure 11:
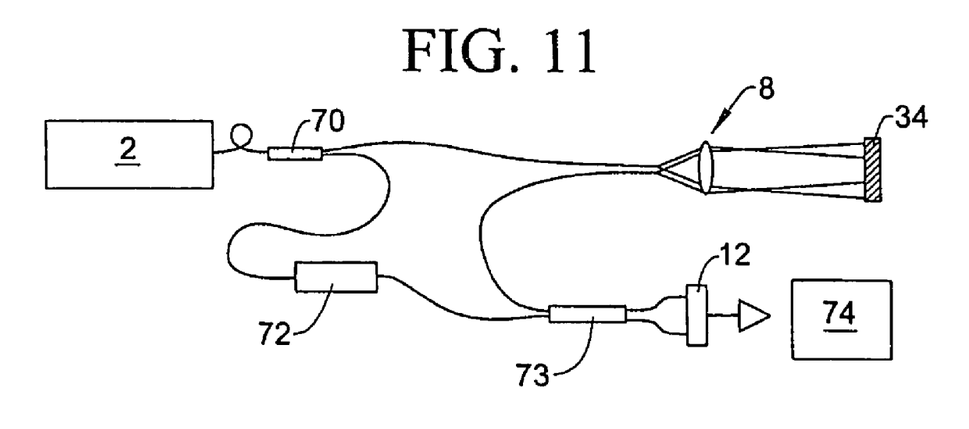
FIG. 11 is schematic diagram of a fiber optic LIDAR system using a biaxial single aperture transceiver in accordance with the invention.

Further improvements in isolation (at least 10 dB) can be realized by reducing the back reflection from the waveguide tips, either by applying an AR coating to the tips, or angle polishing them. Even more isolation can be realized by placing lower index or even opaque media between the two waveguides, although this might be difficult in some cases (like the multiple waveguide configuration of FIG. 11c).

In an embodiment where two waveguides are located at the focal point of the 150 mm focal length lens and the distance to the target is 30 m, the radius of the spot 38 is 125 µm, which means that spacing the input and output waveguides at 30 µm will ensure that the detector is within the spot 38. The most intense part of the image is at the tip of the transmitter waveguide, so the receiver waveguide is preferably placed to the side of the transmitter waveguide, which reduces the coupling efficiency compared to using a single waveguide for transmit and receive. In our example, the power coupled into the receiver waveguide will be $\exp(-2(30/125)^2)=89\%$ of what it is coupled into the transmitter waveguide because of the Gaussian intensity distribution of the image. The 11% loss compared to the single waveguide approach of FIG. 4 is acceptable given the greatly improved isolation, over 30 dB better than commercially available Note that this loss relative to a single waveguide transceiver was calculated at a range of 30 meters. If the target were closer, the image size would increase according to the simple lens equation, and the loss relative to a single waveguide transceiver is smaller. The actual signal strength remains constant because as the image size increases, the amount of light coupled into the fixed receiver fiber decreases, but this is compensated by the increase in power collected from the closer target.

However, as the range is increased, the image shrinks until a certain point when it is smaller than the waveguide spacing. At this point a blind spot is created, but the transition is gradual especially in the case of single mode waveguides. In that case we define the blind spot to start at the range $R_{max}$ where the loss relative to a single waveguide transceiver (FIG. 4) reaches $1/e^2$ (13.5% or −8.6 dB). Using the simple lens equation this gives $$R_{max} = \frac{Df}{2d} + f \quad (8)$$

where D is the diameter of the beam at the target (measured between the $1/e^2$ points), d is the separation between a transmitter and receiver waveguide and f is the focal length of the lens.

For our example with 30 µm separation, 150 mm focal length, and a 50 mm diameter beam, the maximum range is about 125 meters. This analysis is only an approximation because other details of coupling have been left out (like phase matching the return field to the receiver waveguide). The result is similar for multi-mode waveguides, but one has to compute an overlap integral between the core of the receiver fiber and the image intensity distribution function.

Another important consideration in the design of a transceiver in accordance with the invention is the reflection from the optical elements in the aperture shared by the waveguides. For two waveguides coupled to a plano-convex lens, the plane surface of the lens creates a mirror image of the waveguide directed back at itself with intensity equal to the reflection coefficient of the plane surface (about 4% for air-to-glass transitions). This image will be at twice the distance between the waveguide and the lens. For single mode waveguides perfectly aligned with each other, the coupling coefficient at distances much larger than the core size is extremely small. Moreover, any backreflection can be reduced by placing an anti-reflection (AR) coating on the surface of the lens.

More care must be taken with the design of the curved surfaces of the objective. It is possible that light reflected from these surfaces will be focused somewhere near the tip of the receiver, which diminishes the isolation.

Because it is often impractical to place the transmitter and receiver side-by-side close to the focal point of an objective because of their sizes the embodiments in accordance with the invention couple the laser and the detector to optical waveguides (e.g., fiber optics or planar waveguides). These waveguides are the placed very close to one another to maximize the range of overlap between the illumination beam and the field of view of the detector. Known waveguides generally comprise a transparent core surrounded by a transparent cladding with a lower index of refraction to contain light in the core by total internal reflection. The core size can be very small, e.g., about 6-10 wavelengths in diameter in the case of cores propagating a single transverse mode, and these are called single mode waveguides. Larger cores carry more than one transverse mode and are called multimode waveguides. While the cores may be small, commercially available optical waveguides are typically 80 µm or 125 µm in diameter. This size is desirable to provide robust fibers that can be handled, but the diameter effectively precludes achieving the 30 µm spacing discussed above to achieve increased operating ranges. Thus, in accordance with one embodiment of the invention, these commercially available fibers are modified by reducing the diameter of the ends to allow the ends to be held close to each other in the focal plane of the telescope.

An objective of the invention is to provide a single aperture LIDAR system where the center-to-center spacing of the illumination and detector apertures is less than about 80 µm. In a preferred embodiment, the robust optically fibers having diameters of 80 µm or 125 µm are modified such that illumination and detector apertures are spaced by about 30 µm. In general, the separation should be about twenty wavelengths without the use of metallizing or other such techniques.

In accordance with further aspects of the invention other waveguides such as optical waveguides based on the principles of diffraction and/or total internal reflection and known as photonic crystal waveguides may be used to obtain the desired spacing of illumination and detector apertures. These waveguides generally comprise transparent material with hollow structures in the material designed to propagate light at certain wavelengths. Unmodified commercially available optical fibers can be coupled to these waveguides to provide LIDAR systems with increased range according to the invention.

Both single and multimode optical waveguides will work for a biaxial (or polyaxial) single aperture transceiver. Multimode versions are generally suited only for direct detection applications (e.g., LIDAR range finding) while single mode versions are useful for coherent detection application (e.g., Doppler velocity measurements). This is because of the high mixing efficiency that can be achieved when combining the return signal with the local oscillator in a single mode fiber combiner (the phase fronts will overlap 100% in single mode fiber).

BRIEF DESCRIPTION OF THE DRAWINGS

FIGS. 8(*a*) and 8(*b*) illustrate the construction of an embodiment of the invention.

FIGS. 9(*a*), (*b*), and (*c*) illustrate a multiaxial, single aperture embodiment of the invention.

DETAILED DESCRIPTION OF THE PREFERRED EMBODIMENTS

Figure 7:
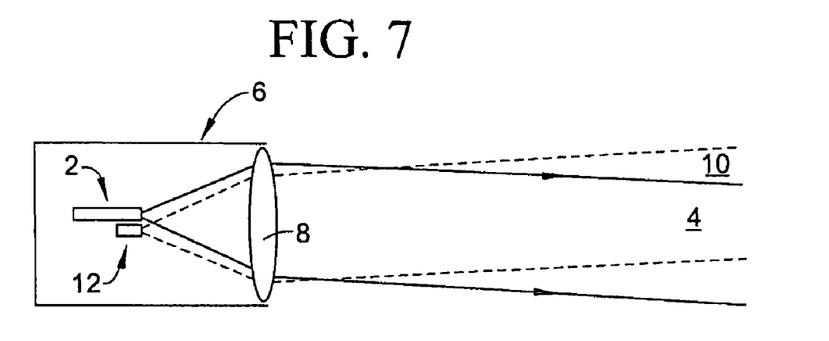
FIG. 7 is a schematic diagram of a first embodiment of the invention.

In accordance with the invention a unique single-aperture, multi-axial transceiver is provided that is particularly useful in a LIDAR system for detecting low velocities at increased ranges. FIG. 7 illustrates a simple biaxial version of the invention. In the embodiment of FIG. 7 the laser transmitter source 2 and the detector 12 share a single objective 8. The objective may comprise multiple optical elements, which may be refractive, reflective, diffractive, or a combination of all, as long as the combination provides the necessary imaging properties. A single optical element is preferred because fewer optical surfaces provide better isolation for the reasons described above with regard to FIG. 5.

The output aperture of the laser is preferably made small compared to the aperture of the objective 8, and it is placed at or near the focal plane of the objective to produce a substantially collimated output beam 4. In the embodiment of FIG. 7, the output of the laser 2 is displaced laterally by a small distance from the focal point of the objective 8 to impart an angle of inclination to the collimated beam with respect to the field of view 10 of the objective. This angle is proportional to the lateral offset.

Similarly, the input aperture of detector 12 is made to be small, comparable to the output aperture of the laser, and it is placed at or near the focal plane of the lens as well. This arrangement provides a FOV to the telescope that is substantially collimated but inclined with the beam 4 from the laser. Mathematically the angle between the two beams is equal to the distance between the transmitter and receiver apertures divided by the focal length of the lens, when the laser and detector apertures are in the focal plane.

As discussed earlier, because the FOV and the transmitter beam diverge their overlap becomes smaller as the distance from the lens increases. The range of this overlap can be improved by:

(a) reducing the distance between the transmitter and receiver apertures by making them smaller (this is ultimately limited by diffraction), and (b) staggering the transmitter and receiver apertures, i.e., place the transmitter aperture at the focal point but place the detector aperture closer to the lens to increase its field-of-view. This solution is, however, is limited by the shadowing of the laser aperture by the detector.

The chief advantage of a single-aperture, polyaxial design is that the laser and transmitter beams do not need to pass through a polarizing beam splitter or other means used to combine beams of light. Thus, isolation is improved over a coaxial, single-aperture design. There is still back reflection and scattering from the optic elements in the aperture (whether lenses or mirrors), but their effects can be reduced because of the distance to these elements from the input and output apertures, and by careful selection of the optic elements with proper AR coatings and surface curvatures.

The multiple waveguide portion of the transceiver can be fabricated by several existing methods. Planar waveguide structures are readily available from several suppliers. Multicore fibers can be manufactured with present day technology. A multi-waveguide structure that is made from one-half of a fused tapered fiber bundle can be formed by those skilled in the art. The manufacture of these designs is more complicated if lower index, photonic crystal or opaque materials must be placed between the waveguides.

A preferred method for manufacturing a dual waveguide structure in accordance with the invention for a transceiver from optical fiber is described in connection with FIG. 8. As noted earlier optical fiber is plentiful and inexpensive, but it is usually not available in diameters that enable the close spacing of cores required in a transceiver. Thus, in accordance with this embodiment of the invention, the diameter of optical fiber (e.g., 80 µm or 125 µm) is reduced to allow the cores to be spaced by less than 80 µm and preferably about twenty wavelengths, or about 30 µm for a light source of 1550 µm. The diameter of the fiber may be reduced by chemical etching, micromachining, or polishing, and the method illustrated in FIG. 8 uses polishing.

An end 40 of a known fiber optic is first bonded to a precision V-groove 44 that has been formed in a plate of material 42, preferably silicon, which is in turn bonded to substrate 46 (preferably Kovar or Invar). It is preferred to have the depth of the V-groove 44 such that the core of the fiber is near the top of the V-groove.

Silicon v-grooves are preferred because they are inexpensive to manufacture and have the high precision required for fixing a fiber in place. Moreover, the coefficient of expansion (CTE) of silicon ($2-3 \times 10^{-6}/°$ C.) is a close match to that of fiber, which is usually made from fused silica (CTE $0.5 \times 10^{-6}/°$ C.). The fiber can be fixed in the groove by epoxy (such as Epotek 353ND) or by a low temperature glass solder (available from Diemat). Metal solders can be used, but these require both the fiber and the V-groove to be metallized. Techniques for achieving this exist and are well known by those skilled in the art.

The silicon plate having the V-groove is bonded to substrate 46 with an adhesive, or metal solder. Standard techniques for doing so are familiar to those in the opto-electronics packaging industry.

Then, the cladding of 40 is polished to remove cladding material from the fiber, the result of which is shown in FIG.

8(*a*). In this step, enough of the original cladding is removed to provide about one-half of the desired core-to-core separation. For increased isolation the polished surface 48 can be metallized. A standard titanium-platinum-gold layer has good adhesion to glass. A relatively thick layer of gold is preferred because its ductility protects the fiber when it contacts the other fiber during the next step.

Figure 8:
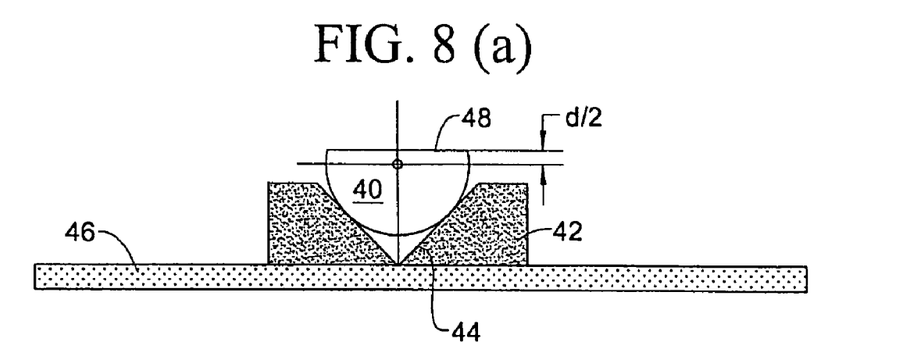

Two fiber-in-groove assemblies as illustrated in FIG. 8(*a*) are prepared and then bonded together in a sandwich such as that shown in FIG. 8(*b*). Spacer elements 50 are machined to provide the desired separation between the cores of the fibers 40 and should have a low CTE that closely matches that of the substrate or the V-groove. The entire sandwich can be bonded together with epoxy or some other adhesive, or even soldered together as long as the spacer elements are properly metallized. The resulting sandwich can be made very compact, lightweight and rugged. The bond thickness should be made as small as possible to keep the core-to-core separation from changing too much with temperature.

The waveguides may be separated by an air gap 52 to provide isolation if no opaque material is used. Alternatively the gap 52 may be filled with epoxy or other adhesive to make the assembly more robust. This may be necessary if the tips of the fibers are to be polished also. AR coatings can be applied to the tips of the fibers after the assembly is completed and any polishing is done.

This method of assembly can be used to provide additional waveguides. The chief advantage of this assembly method is that it allows a transceiver to be constructed from readily available components and materials, improves the isolation between the waveguides by placing a lower index of refraction medium between them, or an opaque material like a thin metal film, and allows one to stagger the fiber tips along the optic axis of the objective to provide an increase in range.

In another alternative, the two waveguides are not themselves bonded to each other but are held by dissimilar metal structures where the spacer elements 50 and the plates 42 have different coefficients of thermal expansion. It can be shown that by selecting the correct ratio of the length (L) of a low CTE material for spacers 50 to the length of (G) a higher CTE material 42, the gap between the fibers can be made to stay relatively constant with temperature. The ratio is $L/(L-G) = \alpha_2/\alpha_1$. This can be refined to include the thermal expansion of the substrate and v-groove material.

Figure 9A:
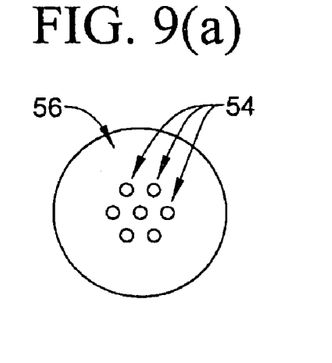
Figure 9B:
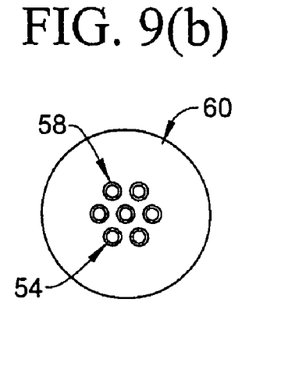
Figure 9C:
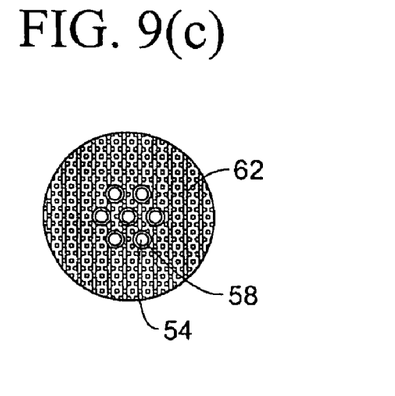

A transceiver can also be assembled from ordinary optical fiber by first etching the last inch or so of each fiber in hydro-fluoric acid until the desired diameter is achieved. These etched fibers can be metallized (optional), bundled into a ferrule, and bonded and with an epoxy that has excellent wicking properties (such as Epotek 353 ND). Once the epoxy is cured, the excess fiber can be trimmed to the surface of the ferrule and polished. This technique is very straightforward to those familiar with fiber connector polishing. Extreme caution is required when handling hydrofluoric-acid. End views of the resulting geometry of fiber bundles formed in this manner is illustrated in FIGS. 9(*a*) through (*c*). FIG. 9(*a*) illustrates cores 54 in cladding 56. FIG. 9(*b*) illustrates a plurality of cores 54, each with an inner cladding 58, held in an outer cladding 60. The embodiment of FIG. 9(*c*) is similar to that of FIG. 9(*b*) except that the fibers are held together in an opaque medium 62, such as metal or a photonic crystal to further reduce coupling among the fibers.

Tapered fiber bundles may also be manufactured by heating a bundle of fibers to the softening point and pulling them. The fibers naturally reduce in and fuse together. After the fused portion of the fiber bundle has cooled, it can be cleaved in the middle to create one-half of a fused tapered fiber bundle. The tip of this would be placed at the focal point of an objective in a transceiver.

The invention contemplates the use of photonic crystal fiber designs that permit construction of waveguides with extremely good isolation between the cores.

One problem with a multicore fiber approach illustrated in FIG. 9 is that the laser and detector must be coupled to the correct cores without compromising the isolation. Thus is not a problem with the "tapered fiber bundle" or "polish and sandwich" approaches described herein because the separate waveguides are combined in a gradual fashion.

Figure 10:
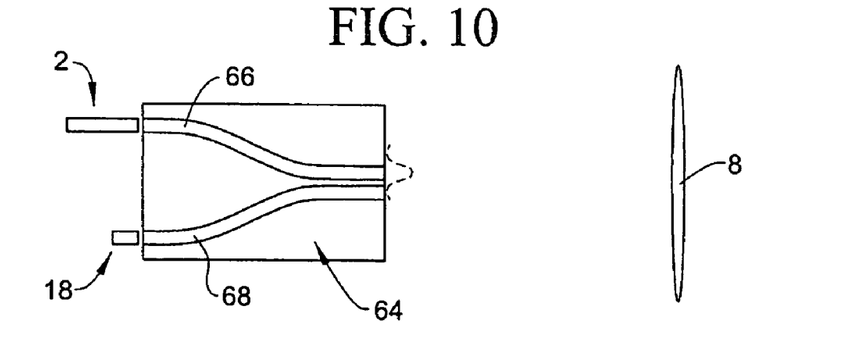
FIG. 10 is a schematic of a biaxial, single-aperture transceiver in accordance with the invention made with a single mode planar optical waveguide.

Finally, a transceiver may be constructed from an objective and a planar optical waveguide 64 as depicted in FIG. 10. Planar optical waveguides are slabs of transparent material into which higher index transparent waveguides have been created In the example of FIG. 10, two waveguides 66 and 68 are initially spaced far apart to allow easy coupling to the transmitter and detector (as by optical fibers). The spacing between the waveguides is gradually reduced whereby their ends are close as described above and placed at or near the focal point of objective 8. Planar waveguides can also be stacked if multiple transmitter and or receiver waveguides are desired. New developments could allow lasers and detectors to be fabricated directly on the planar waveguide.

The waveguides of FIG. 10 may be formed by increasing the index of refraction in the desired waveguide regions by known techniques, including doping by photolithographic techniques and localized laser heating of a silica or germanium substrate.

FIG. 11 illustrates an optical-waveguide-based heterodyne (or offset homodyne) LIDAR system with a transceiver. A beam splitter 70 provides a part of the input beam from laser 2 to a radio frequency (RF) shifter 72, which is usually an acousto-optic modulator (AOM) used to provide a frequency offset to the Doppler signal that appears at detector 12. This enables one to determine the direction of the moving target by the side of the frequency offset on which the signal appears. Light from the source is combined with received light at coupler 73, and the combination is incident on the detector 12.

The spectrum analyzer 74 is used to obtain the frequency of the signal, and thus the velocity of the target. The laser 2 may be pulsed for range finding and velocity measurements or CW for velocity only. If range finding is the sole use, then tapping off a portion of the output to the shifter is not required.

In another configuration, the AOM 72 could be eliminated from the LIDAR system depicted in FIG. 11 to make a homodyne system. Doppler measurements are still possible but an in-phase/quadrature system is required to determine the direction of motion.

Figure 12:
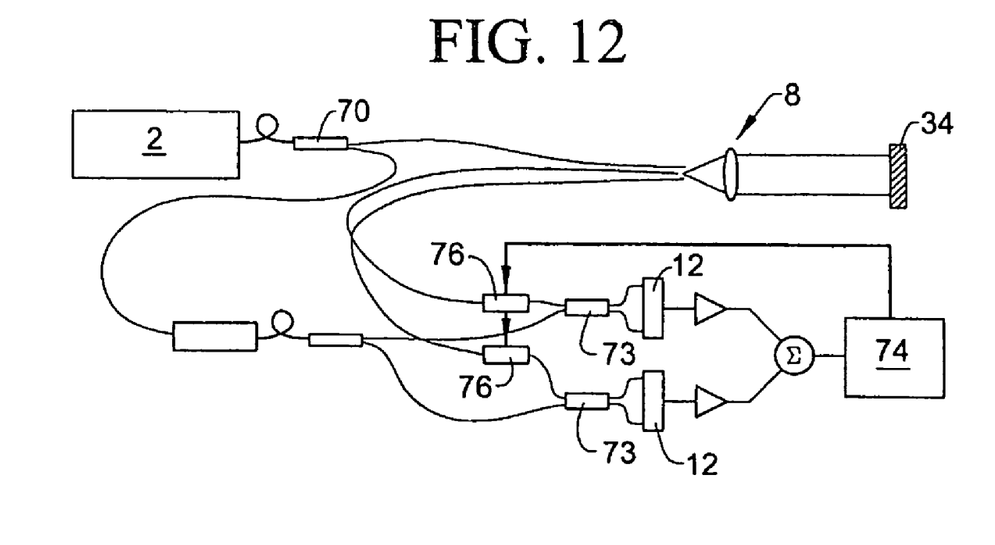
FIG. 12 is a schematic diagram of a fiber optic LIDAR system using a triaxial single-aperture system in accordance with the invention.

A big advantage of the transceiver is that the use of small optical waveguides enables many of them to be placed in close proximity to one another. For example, many receiver optical waveguides can be arranged in a circle around the transmitter fiber. This allows detection of more of the return signal. In the case of direct detection, all of the receiver waveguides can be simply combined into one waveguide that is coupled to a detector. If velocity information is desired, then the signals from the detectors must be coherently summed (i.e., phase matched) to obtain the benefit of the several detectors. An example of this type of system is illustrated in FIG. 12. In the embodiment of FIG. 12 one waveguide is used for the transmitter and two receiver waveguides are placed on opposite sides of the transmitter waveguide. An equal gain, phase-matching system using lithium niobate modulators 76 is used in the optical circuit to match the phases of the two receiver signals. This technique is extremely useful for improving the signal-to-noise ratio for returns from diffuse hard targets where laser speckle is a problem.

The transceivers described herein can be used for free space optical communications where one transceiver lies in view of the other, or in the unusual circumstance that a direct line of sight is between transceivers is not possible, and the signal must be bounced from a hard target. This may be practical in cities where the signal has to get around tall buildings or other obstructions.

The transceivers can have multiple transmitter waveguides as well. This can be useful for Differential Absorption LIDAR, or perhaps as a multi-channel means for communication.

The operating principle described herein for a transceiver extends to all electromagnetic frequencies, not just optical. It is just the scale of the elements that changes. For example a transceiver operating in the low Terahertz region is a practical possibility with present day technology, and one operating in the low Megahertz regime would require a large aperture.

Modifications within the scope of the appended claims will be apparent to those of skill in the art.

We claim:

1. A transceiver comprising:
an objective;
a light source element configured to form a source aperture placed near a focal point of said objective such that said objective generates an illumination beam therefrom, the illumination beam being directed to reflect from a target;
a detector element placed near said light source element and configured to form a detector aperture to receive light reflected from the target; and
wherein said source aperture and said detector aperture comprise two separate, closely spaced single-mode optical waveguides, and
wherein said source aperture and said detector aperture are spaced from each other by a distance between about ten to sixty times a wavelength of said light.

2. The transceiver according to claim 1, wherein said distance is about 80 µm.

3. The transceiver according to claim 1, wherein:
said light source element comprises said source single-mode optical waveguide, which comprises an optical fiber coupled to a laser; and
said detector comprises said detector single-mode optical waveguide, which comprises an optical fiber coupled to a detecting element.

4. The transceiver according to claim 3, wherein:
an end of said single-mode fiber waveguide forming said source aperture is held in a groove in a first plate;
an end of said single-mode fiber waveguide forming said detector aperture is held in a groove in a second plate; and
the ends have diameters of less than said distance.

5. The transceiver according to claim 3, wherein ends of said single-mode optical fiber waveguides forming said source aperture and said detector aperture, respectively, are formed by a tapered fiber bundle.

6. The transceiver according to claim 1, wherein the single-mode optical waveguides forming said source aperture and said detector aperture, respectively, are planar waveguides.

7. The transceiver according to claim 1, further comprising:
a measuring device configured to determine a velocity of the target by comparing light from the source aperture with that received by the detector aperture.

8. The transceiver according to claim 7, wherein:
said short distances are those distances R, obeying a relation $0 < R \leq R_{max}$;
a maximum distance is given by $R_{max} = (Df)/(2d) + f$,
D is a diameter of a source beam at the target, d is the distance between a transmitter and receiver waveguide, and f is a focal length of the objective,
the focal length of the objective being f=150 mm;
the distance is d=30 µm; and
the diameter of the illumination beam is D=50 mm;
whereby velocities are measured within distances less than $R_{max}$=125 meters.

* * * * *